Figure 1:
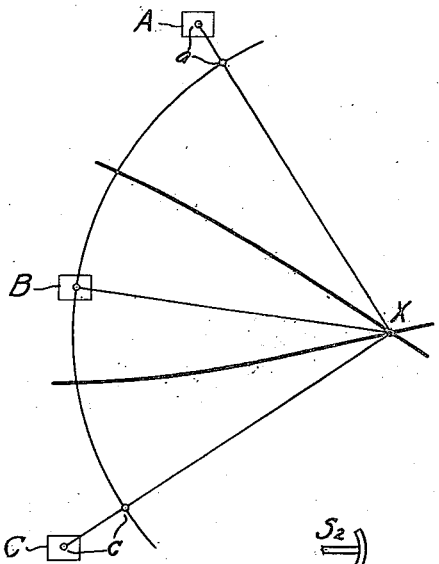

J. B. MORRILL.
ELECTRIC WAVE RANGING SYSTEM.
APPLICATION FILED SEPT. 30, 1920.

1,406,996.

Patented Feb. 21, 1922.
2 SHEETS—SHEET 1.

Inventor:
Joseph B. Morrill
by C. C. Sprague, Atty.

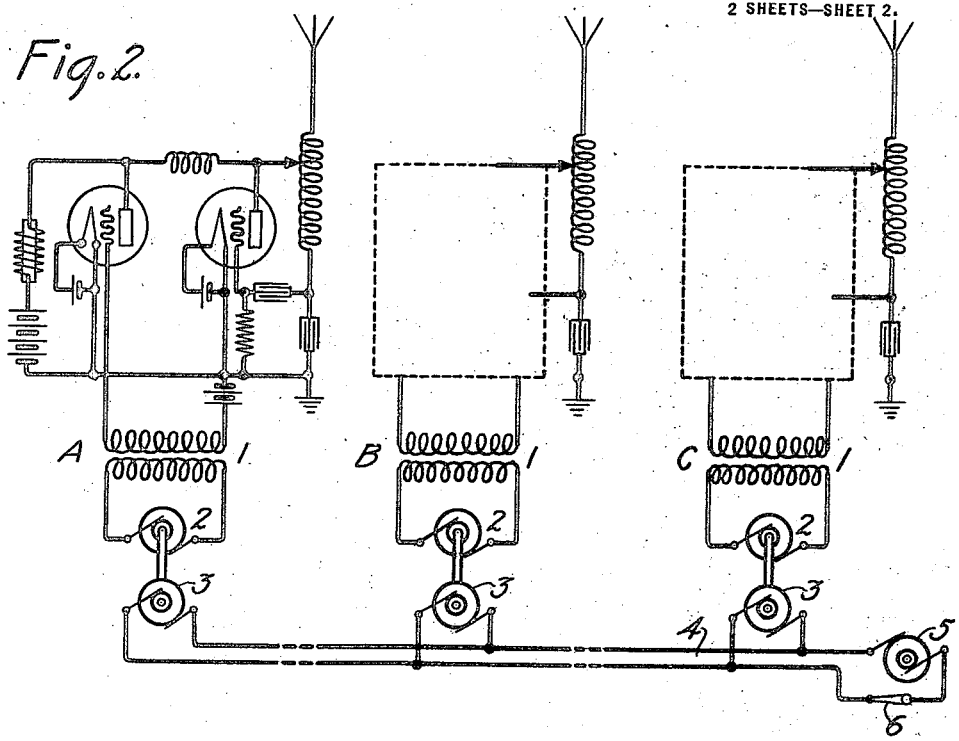
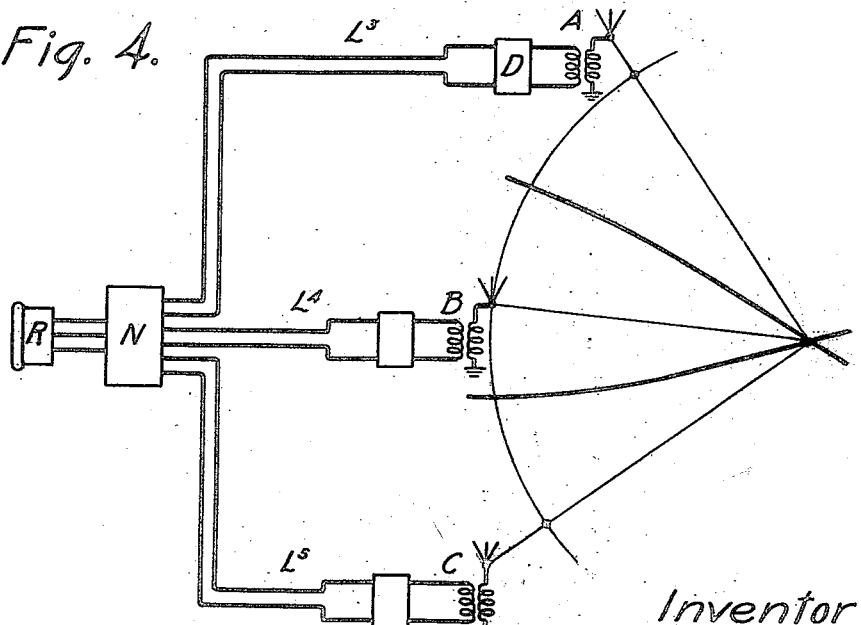

UNITED STATES PATENT OFFICE.

JOSEPH B. MORRILL, OF ST. LOUIS, MISSOURI, ASSIGNOR TO WESTERN ELECTRIC COMPANY, INCORPORATED, OF NEW YORK, N. Y., A CORPORATION OF NEW YORK.

ELECTRIC-WAVE-RANGING SYSTEM.

1,406,996.  Specification of Letters Patent.  Patented Feb. 21, 1922.

Application filed September 30, 1920. Serial No. 413,874.

*To all whom it may concern:*

Be it known that I, JOSEPH B. MORRILL, a citizen of the United States, residing at St. Louis, in the county of St. Louis, State of Missouri, have invented certain new and useful Improvements in Electric-Wave-Ranging Systems, of which the following is a full, clear, concise, and exact description.

This invention relates to electric wave ranging systems and more particularly to means for determining the position of an airplane or ship.

As is well-known, the position of any point is determined by its distance from two known or fixed points. Where these distances are not easy to measure, as for example between an airplane in flight at night and two fixed observer stations, it may, however, be possible to quite readily determine the difference of the two distances by observing the difference in time of arrival of energy simultaneously transmitted from the airplane to the observer stations or vice-versa to the airplane. This difference in arrival time multiplied by the propagation velocity of the energy gives the difference in distance.

When the distance of an undetermined point from a fixed point differs from its distance from another fixed point by a definite amount, the undetermined point lies somewhere on a hyperbola which can be readily plotted with respect to the two fixed points. If another such hyperbola be determined by comparing the distance to one of these given points with that to a third given point, the intersection of the two hyperbolas determines the position of the undetermined point. This general principle is well-known and is made use of in the sound ranging system of the British Patent 7172 of 1915.

The accuracy and effectiveness of sound ranging systems are subject to serious limitations imposed by the climatic conditions particularly in the case where the transmission is from aircraft. It is a matter of common observation that the ordinary binaural sense of the ears is altogether unreliable in determining the position of an airplane on a windy day. Moreover, the accuracy of sound ranging in air is confined to a limited range and beyond a comparatively short distance this method entirely fails.

The present invention overcomes the inaccuracy and range limitations of sound ranging by the use of free electric waves. The propagation velocity of these waves is negligibly, if at all, affected by climatic conditions, and the distances over which accurate operation may be had are, for practical purposes, unlimited. The invention also comprehends the use of other ether waves of similar character such as light and radiant heat and these are included by the term "electric waves" wherever used in connection with this specification.

According to this invention electric waves are simultaneously transmitted over three courses between three fixed observing stations and the aircraft or point to be located. The velocity of propagation (approximately $3 \times 10^8$ meters per second) is known. From the previous discussion it will be apparent that the only data necessary is the difference in arrival time. Obviously, of two waves of the same phase starting at the same instant, the wave travelling the longer distance will arrive behind the wave travelling the shorter distance and the phase difference of the two waves is a measure of the difference of their arrival time. According to the present invention the energy of the earlier arriving wave is caused to traverse a phase retarding path so as to make the phases of the two waves the same, as indicated by a null indication obtained when their energies are opposed to each other in a differential indicator.

A feature of the invention consists in transmitting the energies over the different courses, as carrier waves of correspondingly different frequencies, to enable them to be readily separated at the receiver. In order to secure an audible note, so as to determine when a phase balance has been secured, each of these carrier waves may be modulated in accordance with the same audible frequency wave.

Figure 3:
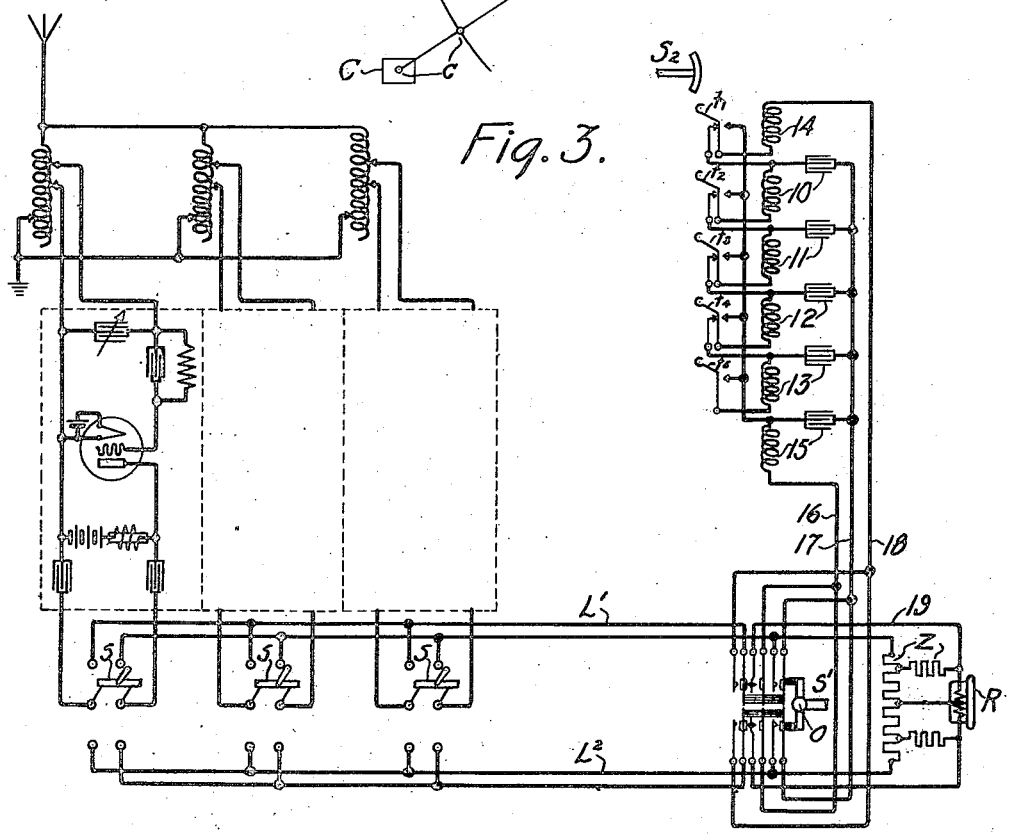

The invention may be better understood upon consideration of the following detailed explanation taken in connection with the drawing in which Fig. 1 indicates diagrammatically the general principle involved in ranging systems of this character; Fig. 2 illustrates diagrammatically the energy transmitting system for three fixed stations; Fig. 3, a receiving station for co-operation with the transmitting station of Fig. 2 and Fig. 4 the receiving arrangement of a modified system.

Referring to Fig. 1 which may be taken as a map of a considerable territory, A, B and C designate the positions of fixed observing stations and X that of a point, the position of which is to be determined. The arc drawn through point P with X as a center indicates the difference in distances $a$ and $c$ of stations A and C with respect to X. If electric waves leave A, B and C simultaneously and in phase, the distances $a$ and $c$ may be measured at X by the phase difference of the waves received from the three stations. This enables the two hyperbolas indicated in heavy lines to be plotted to determine by their intersection the position of X. It should be noted that it is immaterial from the standpoint of the calculations whether the waves are transmitted simultaneously from A, B and C to X or from X to A, B and C. In the first method which is that employed in the system of Figs. 2 and 3, the measurements are determined at point X, which is, for example, on the airplane. In the second method, that employed in the method of Fig. 4, the measurements are made at one or more of the observing stations and the result is communicated back, if necessary, to the airplane at X.

Referring to Fig. 2, there are illustrated three radio transmitters of three observers' stations, A, B and C. The radio apparatus involved is of the well-known type disclosed at page 360 of the paper entitled "Radio telephony" presented by Messrs. Craft & Colpitts before the American Institute of Electrical Engineers, February, 1919. It need merely be noted here that each of the three transmitters is arranged to send out its distinctive carrier frequency energy modulated in accordance with the audible frequency wave supplied to transformer 1 by generator 2. The three generators 2 are preferably sources of pure sine waves and in any case should produce as nearly the same wave form as possible. These generators are driven by synchronous motors 3 connected to alternating current mains 4 supplied by an alternating current source 5 which is connected thereto at station C through controlling key or switch 6. As will later be explained, the various modulating generators 2 are so adjusted that the waves which they produce are in time phase. The operation of generators 2 is controlled by switch 6.

Fig. 3 illustrates diagrammatically an airplane receiving station co-operating with the transmitting stations of Fig. 2. As illustrated, the receiving station comprises an antenna tuned to three frequencies. The path for currents of one of these frequencies and its vacuum tube detector circuits, of conventional design, are indicated in one of the dotted rectangles and it is to be understood that the apparatus and circuits indicated by the other two rectangles are similar in every respect, except that each is designed to receive and detect carrier waves of a distinctive frequency. Each detector tube circuit is provided with a double throw switch S by means of which it may be connected to either of two lines, $L^1$ and $L^2$ which are both connected to a differential receiver R. The detected audible frequency currents from one of the carrier waves may be supplied to line $L^1$ and the detected currents from another of the carrier waves to line $L^2$ to determine their phase difference. If, with no phase adjustment, a null result is obtained in receiver R, the two carrier waves have been transmitted over the same effective electrical distance. In general, however, it is necessary to introduce phase retarding means into either line $L^1$ or $L^2$ to secure neutralization.

The phase retarding means includes an artificial line consisting of a plurality of similar sections 10, 11, 12 and 13 and two terminal part sections 14 and 15. Each full section consists of a series inductance and a shunt capacity and the two end part sections together constitute a symmetrical F section of the same total series inductance and shunt capacity as a full section. Such an artificial line of finite length behaves, as is well known, like a section of a line of infinite length, providing that its terminating impedance is, for currents of all the frequencies which affect the line, equal to the impedance of the remainder of the infinite line for which this terminating impedance is substituted.

If the detected wave is not a simple sine wave, it may be resolved into a plurality of different frequency components. If each component were not retarded in phase by the artificial line by an angular amount proportional to the frequency of that respective component, the neutralization would not be satisfactory. To prevent this, the well-known "distortionless" artificial line having the same ratio between its series resistance and series inductance as between its shunt conductance and shunt capacity may be used. (See pages 77 and 107 "Propagation of Electrical Currents in Telephone and Telegraph Conductors," J. A. Fleming, Second Edition, 1912, D. Van Nostrand Company, New York.) For the range of frequencies in which we are interested, the shunt conductance may be made zero and the series resistance may be made as near zero as possible without seriously affecting the distortionless quality of the line. This fact has been demonstrated mathematically and experimentally. The terminal impedance of such a line may in general be approximately a pure resistance, and preferably the impedance elements Z and receiver R are constructed so as to have negligible reactances. Each section of such a line retards the phase of transmitted currents by a definite amount. With switching arrangements to connect in sections successively, until a balance is obtained, the system may be calibrated so as to indicate directly distances such as $a$ and $c$.

The phase retarding means includes in addition to the artificial line a switch $S^1$ for introducing it either into line $L^1$ or $L^2$ according to whether the switch is in its upper or lower position and a second switch $S_2$ cooperating with contactors $t_1$, $t_2$, etc. to connect in the proper number of sections of the artificial line. Suppose one of the detector circuits is connected to line $L^1$ and the detector circuit for the more distant station is connected to line $L^2$. It will be necessary in order to obtain a balance to introduce retarding sections into line $L^1$. To do this, switch $S^1$ is moved about its pivot O to its upper position. This opens one side of the circuit $L^1$ and prepares connections for the artificial line. If now switch $S_2$ is moved to engage $t_1$ and move it to its forward contact, a circuit may be traced from a contact of the detector switch S, upper conductor of line $L^1$, contact of switch $S^1$, conductor 18, part section inductance 14, contactor $t_1$, half section inductance 15, conductor 16, contact of switch $S^1$, upper conductor 19 of line $L^1$, receiver R and impedances Z back over lower conductor of line $L^1$ through switch S to the plate of the detector. It should be noted that the shunt capacity of the part section including coil 15 is also introduced thus completing one section of the artificial line. Movement of switch $S_2$ into engagement with contactor $t_2$ adds section 10. In this manner additional sections may be introduced one at a time until a balance or null effect is observed at receiver R. When such balance is obtained the electrical difference in length of the two lines $L^1$ and $L^2$ just compensates for the electrical difference in length of the two paths through space over which the energy arrived at point X. To compensate in the opposite direction, that is to increase the electrical length of $L^2$ with respect to $L^1$, it is only necessary to shift switch $S^1$ to its lower position and thereafter move $S_2$ until a balance is secured in the receiver.

The method of adjusting the phase of the modulating generators 2 at the transmitting stations of Fig. 2 may now be explained. Assume that generator 2 at station C is taken as the standard and it is desired to adjust generator 2 at station B. The actual space distance between stations B and C is measured and the corresponding electrical distance or phase displacement in terms of the frequency of source 2 is calculated. A receiver of the type disclosed in Fig. 3 is set up at station C and the compensation or artificial line introduced into the path of the energy received from the local transmitter at C is made equal to the calculated amount. The energy from station B should now be just neutralized. If it is not annulled the sources 2 at the respective stations are not in phase and that at station B should preferably have an adjustable connection with its driving motor to permit such an adjustment that the null effect may be had in the receiver at C. It is of course possible to measure the phase difference by noting the difference between the calculated and experimental null positions of the compensator and to introduce this phase difference as a correction factor when receiving at point X from stations B and C. By using such a correction factor, adjustment of the source 2 at station B would not be necessary. The adjustments for station A are obviously obtained in a similar manner.

Fig. 4 illustrates the receiving arrangement when the electrical wave energy is transmitted from point X. The apparatus on the airplane is preferably like that illustrated in Fig. 2 except that a single audible frequency source 2 is preferably used to supply energy of the same phase to the primary windings of all three transformers 1 in parallel. Obviously, any other equivalent arrangement could be used. The energy received at stations A, B, and C is detected in the ordinary manner by conventional radio receiving apparatus D and the low frequency detected currents are transmitted from their respective stations over lines $L^3$, $L^4$ and $L^5$ to apparatus N and receiver R which correspond in every respect to the apparatus shown beneath and to the right of the broken line rectangles in Fig. 2. In this case the electrical lengths of lines $L^3$, $L^4$ and $L^5$ must be determined. The criterion for determining the actual distance differences of transmitted free wave energy in each case is, that when an actual balance is obtained, the total effective electrical lengths of the two paths considering both the free course of the unguided waves and the guided or circuit paths are the same. If the detected wave is not a simple sine wave, it is desirable that lines $L^3$, $L^4$ and $L^5$ each be distortionless or substantially so.

In Fig. 3 a single antenna having 3 degrees of freedom has been illustrated. Obviously three separate receiving antennæ may be used.

For obtaining a balance in the differential receiver R, it is of course necessary not only that the two waves supplied be of similar wave form and opposite in phase but also that they be of equal amplitude. Since the regulation of amplitude by variation of the amplifying factors of the detecting devices is well within the skill of any worker in this art, no particular arrangement for accomplishing this is disclosed.

The calculating station may be equipped with a chart or plotting board having hyperbolas plotted for given compensation readings so that the desired position at the intersection of two such hyperbolas may be read directly.

Although the invention has been illustrated and described in connection with various specific circuit arrangements, it is to be understood that the principles of the invention are capable of various applications. The invention is therefore to be limited only by the scope of the appended claims.

What is claimed is:

1. The method of determinnig the position of a body with respect to three fixed points which comprises ascertaining the differences in length with respect to a given electrical wave length, of the direct paths from said body to said points and calculating therefrom the desired position.

2. The method of determining the position of a distant body which comprises transmitting electrical waves thereto from three fixed points and determining the phase differences of the received waves.

3. The method of determining the position of a distant object which comprises transmitting between said object and two fixed points, energies having different characteristics by which they may be separated when received, receiving said energies, selecting them and measuring their time difference of arrival.

4. The method of determining the relative position of a distant object with respect to two points which comprises transmitting carrier energy of different frequencies thereto from said points, separating the received carrier energies and measuring their time difference of arrival.

5. The method of determining the position of a distant object which comprises producing low frequency waves all having the same frequency and phase, modulating two different frequency carrier waves in accordance with said low frequency waves, transmitting said modulated carrier waves each over one of the courses between said object and two fixed points, receiving said modulated waves, detecting the energy of said received waves to produce detected waves of said lower frequency and measuring the phase difference of said detected lower frequency waves.

6. The method of determining the position of a distant body which comprises transmitting energy over the courses between said body and three fixed points and compensating for the differences in the effective lengths of said courses.

7. The ranging method which comprises receiving electric wave energy at a body from two or more fixed points and determining the relative distances of said fixed points irrespective of any directional characteristics of said energy.

8. The ranging method which comprises simultaneously transmitting energy of different characteristics from two fixed points to an undetermined position, receiving said energy at said undetermined position, separating said energy irrespective of any directional characteristics and measuring the time differences of arrival of said separated energies.

9. The ranging method which comprises transmitting energy of different characteristics from two fixed positions to an undetermined position, receiving said energy at said undetermined position, separating said energy irrespective of any directional characteristics, compensating for the time difference in arrival of said separated energies and deducing therefrom the relative distances of said two fixed positions.

10. A ranging system for determining the position of a body from three fixed points comprising means for measuring the difference in length of the paths between said body and said points with respect to a given electrical wave length and means for computing therefrom the desired position.

11. A system for determining the position of a distant object comprising means for transmitting electric wave energy thereto from three fixed points and means for determining the phase differences of the waves received at said distant object.

12. A system for determining the position of a distant object comprising means for transmitting between said object and two fixed points, energies having different characteristics by which they may be separated when received, means for receiving said energies and means for measuring their time difference of arrival.

13. Means for determining the relative position of a distant object with respect to two points comprising means for transmitting carrier energy of different frequencies to such object from said points, means at said object for separating the received energies and means for measuring their time difference of arrival.

14. Means for determining the position of a distant object comprising means for producing low frequency waves of identical frequency and phase, two sources of carrier waves of different frequency, means for modulating said carrier waves in accordance with said low frequency waves, means for transmitting one of said modulated carrier waves over one of the courses between said object and two fixed points and for transmitting the other of said modulated carrier waves over the other course, means for detecting said transmitted waves to produce detected waves of said frequency and means for measuring the phase difference of said detected low frequency waves.

15. A ranging system for determining the position of a distant body comprising means for causing energy to be transmitted over the courses between said body and three fixed points and means for conpensating for the differences in the effective lengths of said courses.

16. A ranging system comprising means for transmitting electric wave energy from two or more fixed points to a body of undetermined position, means at said body for receiving said energy, and means for determining from said received energy, irrespective of any directional characteristics, the relative distances of said fixed points.

17. In combination, means for transmitting energy of different characteristics from two fixed positions to an undetermined position, means at said undetermined position for receiving said transmitted energy, means for separating said received energy irrespective of any directional characteristics thereof and means for measuring the time difference of arrival of said separated energies.

18. A ranging system comprising means for transmitting energy of different characteristics from two fixed positions to an undetermined position, means at said undetermined position for receiving said transmitted energy, means for separating said energy irrespective of any directional characteristics thereof, means for compensating for the time difference in arrival of said separated energies and means for deducing therefrom the relative distance of said two fixed positions.

19. A ranging system for determining the position of a distant body comprising means for causing energy to be transmitted over the courses between said body and three fixed points and means comprising a transmission line having the property of retarding the angular phase of energy transmitted thereby substantially in proportion to the frequency of said energy for compensating for the differences in the effective lengths of said courses.

In witness whereof, I hereunto subscribe my name this 15th day of September, A. D. 1920.

JOSEPH B. MORRILL.